May 8, 1962 C. F. VAN BENNEKOM ETAL 3,034,058
ELECTRICAL MEASURING INSTRUMENT
Filed Nov. 2, 1959 3 Sheets-Sheet 1
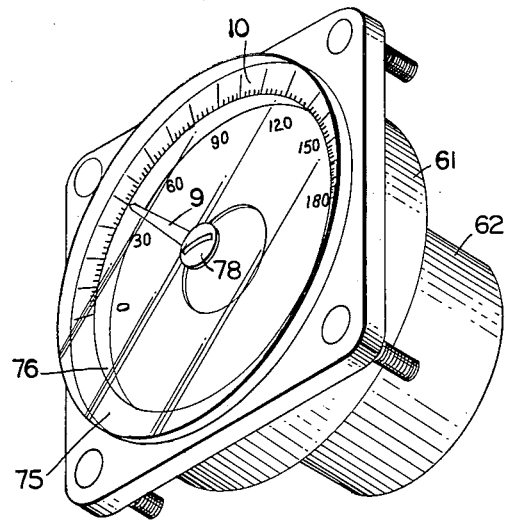
FIG. 2
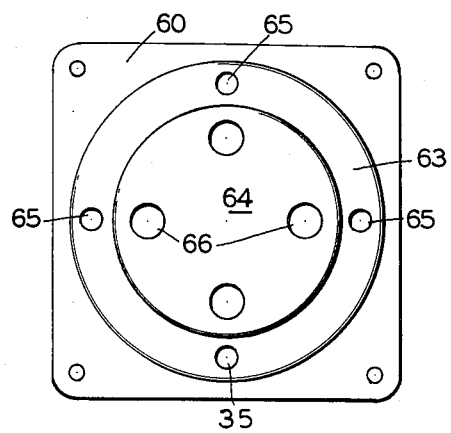
FIG. 6
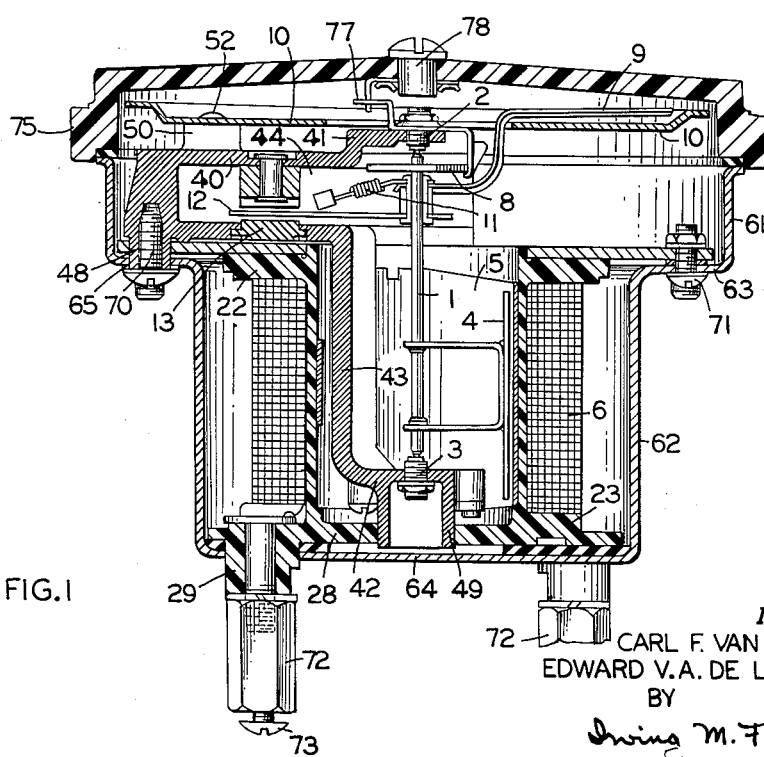
FIG. 1
*INVENTORS*
CARL F. VAN BENNEKOM
EDWARD V. A. DE LAMOUREAUX
BY
THEIR ATTORNEY INVENTORS
CARL F. VAN BENNEKOM
EDWARD V. A. DE LAMOUREAUX
BY
Irving M. Freedman
THEIR ATTORNEY May 8, 1962  C. F. VAN BENNEKOM ETAL  3,034,058
ELECTRICAL MEASURING INSTRUMENT
Filed Nov. 2, 1959  3 Sheets-Sheet 3

INVENTORS
CARL F. VAN BENNEKOM
EDWARD V. A. DE LAMOUREAUX
BY Irving M. Freedman
THEIR ATTORNEY //  # United States Patent Office 3,034,058
Patented May 8, 1962

3,034,058
ELECTRICAL MEASURING INSTRUMENT
Carl F. Van Bennekom and Edward V. A. De Lamoureaux, Lynnfield, Mass., assignors to General Electric Company, a corporation of New York
Filed Nov. 2, 1959, Ser. No. 850,430
6 Claims. (Cl. 324—147)

This invention relates to an electrical measuring instrument, and more particularly to an improved structure which facilitates assembly while insuring accurate positioning of the component parts.

It is a well established fact that the accuracy with which an electric instrument pointer will follow a predetermined pattern to provide a desired scale distribution characteristic is governed by the preciseness with which the various magnetic components, or components which are used to produce or control the magnetic flux, of the instrument are positioned. If the volume and composition of the materials used in the magnetic components of the instrument are constant, positioning of the components is virtually the only factor governing instrument accuracy with concentricity of the components having the greatest effect, particularly in instruments of the moving iron type. Other factors which influence the design of an electrical measuring instrument are the desirability of a small size for a given scale length, low weight, low friction in the moving system, and extreme ruggedness. For vehicular applications, it is important that the accurate positioning of the component parts be maintained even under conditions of severe impact and vibration. Further considerations which influence the design of an electric instrument are cost factors and suitability for mass production manufacturing technique.

It is an object of this invention to provide an improved electric measuring instrument construction which facilitates precise positioning and concentricity of the component parts.

It is a further object of this invention to provide an improved electric instrument structure in which the component parts are interlocked to facilitate assembly and disassembly while at the same time maintaining accurate positioning and rigidity of the structure in the presence of shock and vibrations.

It is a still further object of this invention to provide an improved electric instrument structure which is adapted to high volume production techniques to provide a low cost yet accurate instrument.

It is another object of this invention to provide an improved electric instrument structure in which the component parts of the magnetic components are interlocked in more than one axially separated plane by mating parts which prevent the assembly of misaligned components or which, if the misalignment is slight, can be utilized to move the components into the required alignment upon assembly.

It is yet another object of this invention to provide an improved electric instrument structure requiring a minimum of parts, thus facilitating the accurate assembly and disassembly of the instrument.

Further objects and advantages of the invention will become apparent as the following description proceeds and the features of novelty which characterize the invention will be pointed out with particularity in the claims annexed to and forming a part of this specification.

In accordance with one form of the invention, an electric instrument of the moving vane type is constructed having a molded, hollow spool around which the field coil is wound and about which the other magnetic components of the instrument are secured to insure accuracy of positioning, particularly their concentricity. The various magnetic components comprising the magnetic path, stationary vane, and movable vane are positioned relative to the spool and secured in more than one axially separated plane.

More particularly, the movable vane and its associated frame is supported at one end by a central aperture in the end surface of the spool cooperating with a mating surface of the frame and at the other end by mating parts which connect the frame to the spool through the intermediary of a planar magnetic member molded integrally to the spool. The stationary vane is secured within the spool along the inner surface thereof and so is positioned concentric to the coil. The outer housing, which completes the magnetic flux path, is secured at the upper end through bosses which extend from the frame member through the magnetic member to align all three parts, and at the lower end by terminal bosses integral with the spool and which extend through mating apertures in the housing.

For a better understanding of this invention, reference may be had to the following description taken in connection with the accompanying drawings in which:

FIG. 1 is a cross-sectional view of an instrument embodying the invention;

FIG. 2 is a perspective view of the instrument shown in FIG. 1;

FIG. 6 is a rear view of the instrument housing.

Figure 3:
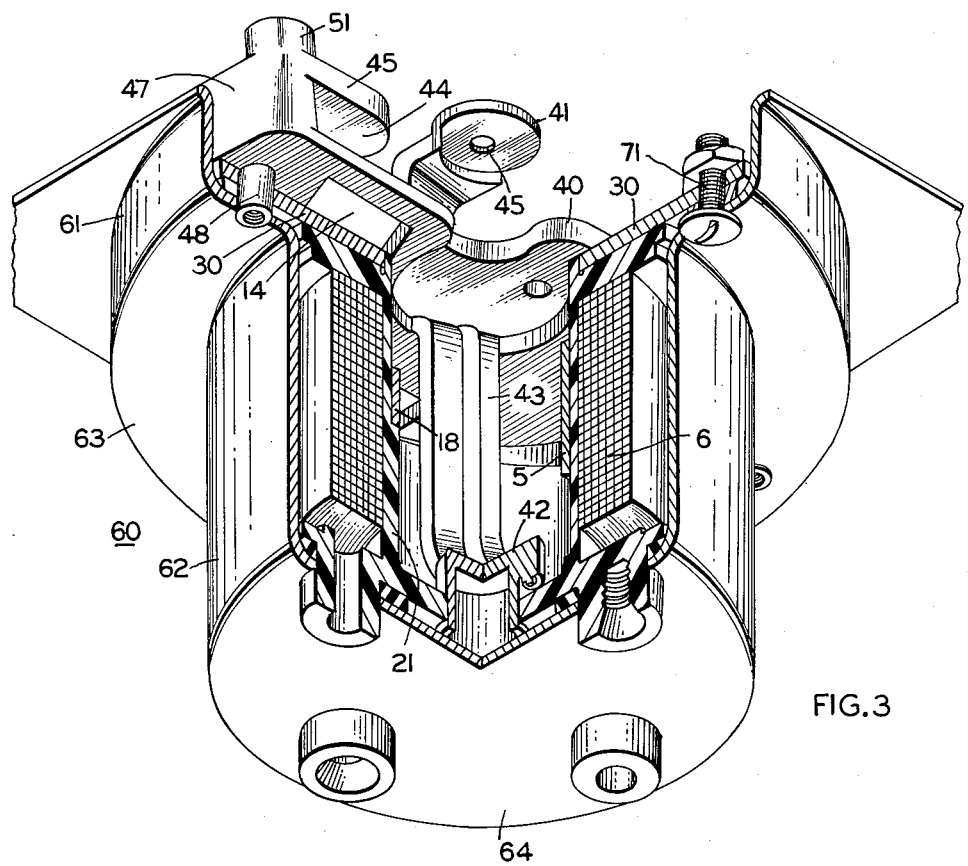
FIG. 3 is a cutaway perspective view of the instrument shown in FIG. 1 illustrating certain features of the invention.

Referring to FIGS. 1, 2 and 3, the invention is shown embodied in an electric instrument of the moving iron type, although it is not necessarily restricted to such an instrument. Shaft 1 is rotatably mounted and supported at the ends thereof by jewel bearings indicated generally as 2 and 3. The shaft 1 supports a movable iron or vane 4 for rotation therewith within the region defined by the stationary vane 5. The current or field coil 6 surrounds the stationary vane 5.

The control spring 8 positions the pointer 9 attached to shaft 1 relative to the scale 10 so that the pointer indicates zero when current flow through the field coil 6 is zero.

The instrument described thus far is essentially the concentric-vane form of the conventional repulsion-type moving iron instrument. Upon current flow through the field coil 6, vanes 4 and 5 are inductively magnetized such that the movable vane 4 deflects an amount proportional to the magnitude of the current flow through the field coil 6 in a manner well known in the art.

It is desirable to control the scale distribution characteristics of the instrument so that an instrument with an accuracy in the order of 1% may be constructed utilizing a pre-printed scale without requiring individual calibration of each instrument. However, to obtain the desired scale distribution accuracy, problems are encountered in precisely positioning and maintaining the position of the magnetic components of the instrument. It is important that the concentricity of the movable vane 4, stationary vane 5, field coil 6, the shielding member, and flux return path member be accurately established and maintained. Instruments constructed in the manner described below insure the accurate positioning and concentricity of the magnetic components thereof.

Figure 4:
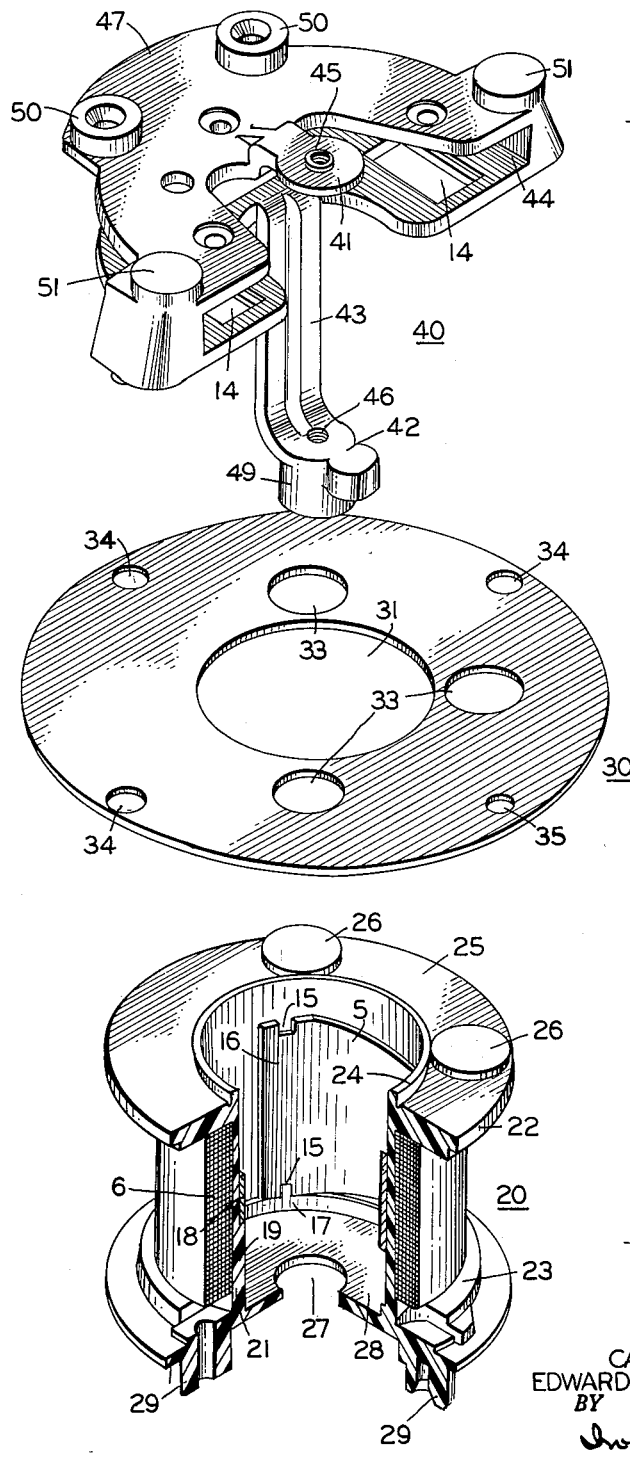
FIG. 4 is an exploded perspective view of the instrument illustrating the mating parts which facilitate the interlocking of the magnetic components of the instrument.

As illustrated in FIGS. 3 and 4, the field coil 6 is wound around spool 20 which is molded of a plastic material such as a polyamide resin. Polyamide resins, such as nylon, are preferable because of their toughness, dimensional stability, ease of repeatability of fabrication, and relatively low cost. The spool 20 comprises a central tubular section 21 and axially spaced flanges 22 and 23 which project radially outward from the top and bottom regions thereof. The coil 6 is wound around the central section 21 in between the projecting flanges 22 and 23. Since the coil 6 becomes the source of magnetic flux when energized, the positioning of all other parts shall be related to the spool 20 in this description, although it is obvious that any one of the concentric members may be taken as a reference. If all parts are concentric with the spool 20, they are concentric with each other.

The magnetic member 30 acts as part of the magnetic flux path and magnetic shield and is constructed of magnetic material having a central aperture 31 concentric with the periphery 32. The magnetic member 30 is positioned around the upper end 24 of the tubular section 21 of spool 20 and is supported by the upper surface 25 of the flange 22. The upper end 24 of the tubular section 21 cooperating with the central aperture 31 of the magnetic member 30 insures the concentricity of the magnetic member with respect to the field coil 6. The magnetic member 30 is angularly positioned and secured through the cooperation of the annularly spaced apertures 33 of the magnetic member with the projecting bosses 26 projecting from the surface 25 of flange 22. The bosses 26 are integrally molded with the spool 20 and may be flattened by pressure and/or heating after the assembly of magnetic member 30 to securely and precisely position the magnetic member on the spool. However, it has been found preferable to insert the magnetic member 30 into the mold prior to the molding of spool 20 so that the bosses 26 may be formed around the apertures 33 during the molding process. The accurate positioning of the member 30 relative to the spool 20 and the securing thereof is facilitated and the members are in effect formed as an integral unit through the molding process.

The concentricity of the stationary vane 5 with respect to the coil 6 is accomplished by positioning and securing it about the interior of the tubular section 21 of spool 20. It is positioned angularly through the cooperation of slots 15 near one end 16 thereof with mating keys formed as integral parts of the spool 20. The bottom edge of stationary vane 5 in the region of end 16 is supported by ridge 17 molded integrally with spool 20 and the other end 18 is supported by the extension 19 of ridge 17 as best shown by FIG. 4. By forming the stationary vane 5 with a radius of curvature slightly greater than that of the interior of the tubular section 21, the stationary vane expands upon insertion to fit snugly against the interior of the tubular section 21 to be concentric to the field coil 6 wound on the other side of the tubular section.

Figure 5:
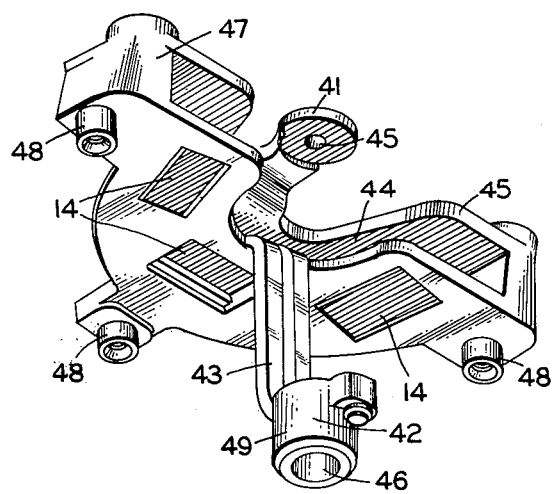
FIG. 5 is a perspective view of the frame assembly associated with the moving system of the instrument.

The moving system is fabricated as a removable unitary structure supported by a die cast frame 40 which is best illustrated in FIGS. 4 and 5. Referring to FIGS. 4 and 5, the frame 40 is substantially semi-circular in shape with axially separated central portions 41 and 42 at the upper and lower ends, respectively, separated by connecting member 43. The central portion 43 is offset as best shown in FIG. 1 such that the moving vane 4, along with shaft 1, may rotate freely between bearings 2 and 3 which in turn are supported respectively by the upper and lower ends 41 and 42. The semi-circular groove 44, formed in the semi-circular main body 47 of the frame 40, permits the rotation of the balance arm and counter weight 11 associated with the pointer 9 as best shown in FIG. 1. The groove 44 also permits the rotation of damping vane 12 which is secured to shaft 1 and which cooperates with permanent magnets 13, one or more of which may be secured to the main body 47 of frame 40 in the magnet openings 14 which contain appropriate slots to support the magnets. The bearings 2 and 3 are supported in apertures 45 and 46 formed in the end portions 41 and 42, respectively, of the frame 40. The concentricity of the moving system, and in particular the movable vane 4 with respect to the fixed vane 5 and field coil 6, is insured through the cooperation of the projecting members of the frame 40 with apertures associated with the upper and lower portions of the spool 20. Accurate positioning of the frame 40 in the upper region of spool 20 is accomplished through the mating of the exterior surfaces of internally threaded bosses 48 which are formed integral with frame member 40 with annularly spaced apertures 34 of shield member 30. The bosses 48 of frame member 40 as best shown by FIG. 5 are annularly disposed about and extend axially down from the periphery of the semi-circular main body 47 of the frame member.

The lower region of the frame 40 is supported and accurately positioned through the cooperation of the outer surface 49 of the tubular lower end portion 42 with the aperture 27 centrally located within the enclosing bottom surface 28 of spool 20. The surface 28 extends inwardly at right angles to axis of shaft 1 as best shown by FIGS. 1 and 4.

It is to be noted that the frame 40 which supports the moving system is securely positioned and supported in two axially separated planes of the spool 20, that is through the cooperation of bosses 48 and apertures 34 in the upper plane and surface 49 and aperture 27 in the lower plane. Determination of frame placement and support in two separated planes brings about several benefits. It facilitates the assembly and disassembly of the parts while maintaining concentricity along their entire length. Also, in the event that any of the parts are defective, for example, if connecting member 43 were bent, the arrangement provides a "fail-safe" feature in that they will not fit together. Since it is difficult to locate the eccentricity that is causing inaccuracy in an electric instrument, this is a particularly desirable feature. Furthermore, since the moving system and wound spool are linked together in two planes in a solid manner through the cooperation of the magnetic member 30, the initial concentricity of assembly is maintained thereafter despite severe impact and vibration.

Also, since the top and bottom jewel bearing apertures 45 and 46 are in close proximity to these two locating planes, the alignment of the jewel holes is maintained under conditions of high shock and vibration preventing subsequent misalignment which would increase the friction of the moving system.

As pointed out above, the positioning and support in two separated planes of the moving system relative to the coil 6 and stationary vane 5 provide a "fail-safe" feature in that misaligned bearings, a misaligned moving system, misalignment in the spool 20 or magnetic member 30, or other misalignments, will result in a structure which will not fit together. However, if the misalignment, for example in the moving system, is slight, a slight pressure in assembly may be sufficient to bend the connecting member 43 of the frame 40 sufficiently to correct the misalignment and enable the proper assembly of the structure. Thus, the structure described above inherently includes a self-aligning action in which it is possible to correct minor misalignments of the component parts and provide a resultant structure having the desired concentricity.

The entire magnetic structure described above is then concentrically positioned as a unit in the housing or "can" 60 which is constructed of magnetic material and functions both as a housing and magnetic return path. The configuration of the housing 60 and the manner in which it is accurately positioned relative to the other magnetic components of the instrument is best illustrated by FIGS. 1, 3 and 6. Referring to these figures, it will seen that the cup-shaped housing 60 encloses and surrounds the other magnetic components of the instrument and includes a pair of axially spaced cylindrical portions 61 and 62 of different diameters formed concentrically about the axis of the housing and connected by portions 63 which is substantially perpendicular to the axis of the housing. The bottom of the housing 64 is substantially parallel to the connecting portion 63 and is axially spaced therefrom. The accurate placement and assembly of the housing relative to the other magnetic components of the instrument is insured by aligning and securing means in connecting portions 63 and bottom 64. Apertures 65 are annularly spaced about the connecting portion 63 such that depending bosses 48 of the frame 40 of the moving system extend through the apertures 65 after passing through the apertures 34 of the magnetic member 30. The bosses 48 thus insure the alignment and concentricity of the moving system, the magnetic member 30 and the housing 60 which functions as a magnetic return path and shield. The parts are secured in position through fastening means such as screws 70 which are screwed into the internal thread of bosses 48 as best shown by FIG. 1. In addition, one or more fastening means 71 may be employed to secure the housing 60 to the magnetic member 30 in the region remote from the semicircular main body 47 of frame 40. The fastening means 71 pass through clearance holes 35 and do not determine the angular positioning of the housing 60 about the moving system of the instrument.

The accurate positioning of the housing 60 and rigidity thereof at the bottom of the instrument is provided by a plurality of annularly spaced apertures 66 in the bottom 64 of the housing through which pass the terminal bosses 29 which extend downwardly from the bottom surface 28 of spool 20 and are molded integrally therewith. It is to be noted that the terminal bosses 29 are rigidly and accurately positioned relative to the aperture 27 of the bottom surface 28 of the spool 20 which determines the positioning of the moving system such that the concentricity of the housing 60 to the moving system and the spool 20 is insured, and the spool 20 in turn insures concentricity with the field coil 6 which is wound around the spool and with the stationary vane 5 which is secured to the inner surface of the spool. Suitable electrical connectors indicated generally as 72 are secured to the terminal bosses 29 and include screws or other fastening means 73 positioned outside the housing 60 and portions which pass through the interior of terminal bosses 29 for electrical connection between the screws 73 and the ends of the field coil 6.

Thus, it will be seen that the housing and shield member 60 is accurately and rigidly positioned and supported in two axially spaced planes through the cooperation of apertures 65 in the upper region of the housing with the bosses 48 of the frame 40 of the moving system, which bosses also pass through the magnetic member 30 to insure the concentricity of the moving system, the magnetic member 30 and the housing 60, and the cooperation of apertures 66 with the terminal bosses 29 to insure the positioning and rigidity of the housing in the lower portions thereof. Since the housing 60 is fabricated from relatively heavy metal, it in turn adds strength and rigidity to those members of the instrument to which it is secured.

Referring to FIGS. 1 and 4, it will be seen that the scale 10 is supported by upwardly extending bosses 50 and 51 integrally formed as part of the frame 40. A plurality of the bosses, such as bosses 50, are internally threaded and screws 52 are passed through the scale 10 to engage the threads and secure the scale in position. A cover member 75 which includes a transparent portion 76 which overlies the scale 10 is then secured to the instrument to protect the internal mechanism. A zero set mechanism indicated generally as 77 cooperates with a zero set screw 78 located in the central region of the cover member 75 in a manner well known in the art.

Therefore, while a particular embodiment of the subject invention has been shown and described herein, it is in the nature of description rather than limitation, and it will occur to those skilled in the art that various changes, modifications, and combinations may be made within the province of the appended claims without departing either in spirit or scope from this invention in its broader aspects.

What we claim as new and desire to secure by Letters Patent of the United States is:

1. In an electrical measuring instrument of the concentric iron vane type, means to concentrically position magnetic components of said instrument comprising a hollow spool of unitary molded construction including a radially extending surface at one end thereof, a field coil winding surrounding and supported by said spool, a stationary vane secured to the interior of said hollow spool, a frame member rotatably supporting a movable vane, and mounting means integral with said spool for supporting said frame member to position said movable vane concentric to said stationary vane and said coil, said frame mounting means being in at least two spaced planes along the axis of rotation of said movable vane, one of said frame mounting means being provided by the cooperation between closely mating positioning means of said frame and positioning means integral with said end surface of said spool and the other of said frame mounting means being provided by the cooperation between closely mating positioning means of said frame and an annular radially extending magnetic member secured by the spool during the molding thereof to the other end of said spool, whereby said field coil, stationary vane, and movable vane are positioned by said spool concentrically about the axis of rotation of said movable vane.

2. In an electrical measuring instrument of the concentric iron vane type, means to concentrically position magnetic components of said instrument comprising: a hollow spool, a field coil winding surrounding and supported by said spool, a stationary vane secured to the interior of said hollow spool, a frame member rotatably supporting a movable vane, mounting means formed integral with said spool for supporting said frame member to position said movable vane concentric with said stationary vane and said coil, said frame mounting means being in at least two spaced planes along the axis of rotation of said movable vane with one of said frame mounting means being provided by the cooperation between mating positioning means of said frame and positioning means integral with an end surface of said spool and the other of said frame mounting means being provided by the cooperation between mating positioning means of said frame and positioning means on an annular radially extending magnetic member secured to the other end of said spool, and a cup-shaped housing constructed of magnetic material concentrically surrounding said field coil, said housing being supported at the open end by support means which cooperate with and position said frame member, magnetic member, and housing relative to each other.

3. In an electrical measuring instrument of the concentric iron vane type, means to concentrically position the magnetic components of said instrument comprising: a hollow spool, a field coil winding surrounding and supported by said spool, a stationary vane supported in a predetermined position within said hollow spool, a frame member rotatably supporting a movable vane, mounting means formed integral with said spool for supporting said frame member to position said movable vane concentric with said stationary vane and said coil, said frame mounting means being in at least two spaced planes along the axis of rotation of said movable vane, one of said frame mounting means being provided by the cooperation between mating positioning means of said frame and positioning means of an end surface of said spool and the other of said frame mounting means being provided by a radially extending annular magnetic member secured to the other end of said spool, and a cup-shaped housing constructed of magnetic material concentrically surrounding said field coil, said housing being supported at one end by support means which cooperate with and position said frame member, magnetic member, and housing relative to each other, and the other end of said housing being positioned by means integral with said spool.

4. In an electrical measuring instrument of the concentric iron vane type, means to concentrically position the magnetic components of said instrument comprising: a hollow spool, a field coil winding surrounding and supported by said spool, a stationary vane supported in a predetermined position within and by said hollow spool, a frame member rotatably supporting a movable vane, mounting means integral with said spool for supporting said frame member to position said movable vane concentric with said stationary vane and said coil, said frame mounting means being in at least two spaced planes along the axis of rotation of said movable vane, one of said frame mounting means being provided by the cooperation between mating positioning means of said frame and positioning means of an end surface of said spool and the other of said frame mounting means being provided by a radially extending annular magnetic member secured to the other end of said spool, and a cup-shaped housing constructed of magnetic material concentrically surrounding said field coil, said housing being supported at one end by support means which cooperate with and position said frame member, magnetic member, and housing relative to each other, and the other end of said housing being positioned by means integral with said spool and including terminal bosses which extend from said spool through apertures in the end surface of said housing.

5. In an electrical measuring instrument of the concentric iron vane type, means to concentrically position the magnetic components of said instrument comprising: a hollow molded unitary spool including a radially extending surface at one end thereof, a field coil winding surrounding and supported by said spool, a stationary vane supported in a predetermined position within said hollow spool, a frame member rotatably supporting a movable vane, mounting means molded integral with said spool for supporting said frame member to position said movable vane concentric with said stationary vane and said coil, said frame mounting means being in at least two spaced planes along the axis of rotation of said movable vane, one of said frame mounting means being provided by positioning means integral with said end surface of said spool and the other of said frame mounting means being provided by an annular magnetic member secured to the other end of said spool, a cup-shaped housing constructed of magnetic material concentrically surrounding said field coil, said housing being supported at one end by support means which cooperate with and position said frame member, magnetic member, and housing relative to each other, and the other end of said housing being positioned by means integral with said spool and including terminal bosses which extend from said spool through apertures in the end surface of said housing, terminals secured to said terminal bosses, and electrical connections from said terminals passing through the interior of said terminal bosses and connected to the ends of said winding.

6. In an electrical measuring instrument of the concentric iron vane type, means to concentrically position the magnetic components of said instrument comprising: a hollow cylindrical spool having an opening at one end and a radially inwardly extending surface at the other end thereof, an annular member extending radially outward from the opening at said one end of said spool, a field coil winding surrounding and supported by said spool, a stationary vane secured to the interior of said hollow spool, a movable vane rotatably supported between two portions of a frame member connected by a first offset axial portion which extends in the direction of the axis of said movable vane, said frame member including a second radially extending supporting and positioning portion which, when said first portion of said frame is positioned within said hollow spool, overlies and is supported by said annular member, and a third portion of said frame member at the end of said first portion remote from said second portion including supporting and positioning means which cooperate with closely fitting mating positioning means of said inwardly extending surface of said spool, and which, in combination with the cooperation between axially extending mating positioning means of said second radially extending portion and said annular member, accurately position said movable vane concentric with and within said stationary vane and said field winding.

References Cited in the file of this patent

UNITED STATES PATENTS

| | | |
|---|---|---|
| 1,719,556 | McCoy | July 2, 1929 |
| 1,776,793 | Miller | Sept. 30, 1930 |
| 2,157,947 | Young | May 9, 1939 |
| 2,610,989 | Wiese | Sept. 16, 1952 |
| 2,875,409 | Lamb | Feb. 24, 1959 |